(12) United States Patent
Agarwal et al.

(10) Patent No.: US 11,458,791 B2
(45) Date of Patent: Oct. 4, 2022

(54) SPRING ASSEMBLY FOR A VEHICLE BOGIE SUSPENSION ARRANGEMENT

(71) Applicant: Volvo Truck Corporation, Gothenburg (SE)

(72) Inventors: Binay Agarwal, Rajganpur Odisha (IN); Ravindra HC, Bangalore (IN); Durga Prasad Cheruvu, Bangalore (IN); Anantha Rama Krishna Lakshmi Narayan Alla, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 16/978,230

(22) PCT Filed: Mar. 8, 2019

(86) PCT No.: PCT/EP2019/055806
§ 371 (c)(1),
(2) Date: Sep. 4, 2020

(87) PCT Pub. No.: WO2019/170844
PCT Pub. Date: Sep. 12, 2019

(65) Prior Publication Data
US 2021/0001677 A1   Jan. 7, 2021

(30) Foreign Application Priority Data
Mar. 8, 2018   (IN) .............................. 201841008605

(51) Int. Cl.
*B60G 9/00* (2006.01)
*B60G 11/40* (2006.01)
(Continued)

(52) U.S. Cl.
CPC .............. *B60G 9/003* (2013.01); *B60G 11/40* (2013.01); *F16F 1/324* (2013.01); *F16F 1/40* (2013.01);
(Continued)

(58) Field of Classification Search
CPC .......... B60G 5/03; B60G 9/003; B60G 11/40; B60G 2202/112; B60G 2202/14;
(Continued)

(56) References Cited

U.S. PATENT DOCUMENTS 2,557,610 A   6/1951   Meyers et al.
3,279,779 A   10/1966   Thomas et al.
(Continued)

FOREIGN PATENT DOCUMENTS

BE         754026 A  * 12/1970  .......... B60G 17/023
CN    105546008 A  *  5/2016
(Continued)

OTHER PUBLICATIONS

International Search Report and Written Opinion of the International Searching Authority, PCT/EP2019/055806, dated Jun. 24, 2019, 12 pages.

*Primary Examiner* — Jonathan Ng
*Assistant Examiner* — Scott F. Underwood
(74) *Attorney, Agent, or Firm* — Sage Patent Group

(57) ABSTRACT

A spring assembly for a vehicle bogie suspension arrangement. The spring assembly includes a set of washers moulded into an elastomer body. The spring assembly has an axial extension in an axial direction and the washers are arranged relative to each other in the axial direction. At least one of the washers is a spring washer including a spring washer body and at least two spring tongues. Each spring tongue has a spring base connected to the spring washer body and a spring tip distal to the spring base. At least a (Continued)

portion of the spring tongue is located at a non-zero distance from the spring base in the axial direction.

16 Claims, 7 Drawing Sheets

(51) Int. Cl.
  *F16F 1/40* (2006.01)
  *F16F 1/32* (2006.01)

(52) U.S. Cl.
  CPC .......... *F16F 1/403* (2013.01); *B60G 2202/14* (2013.01); *B60G 2206/0112* (2013.01); *B60G 2206/42* (2013.01); *B60G 2300/0262* (2013.01)

(58) Field of Classification Search
  CPC ...... B60G 2202/143; B60G 2206/0112; B60G 2206/42; F16F 1/324; F16F 1/32; F16F 1/40; F16F 1/403; F16F 1/3615; F16F 1/371; F16F 1/3876; F16F 1/387
  USPC .......................... 267/292, 293, 294, 153, 30
  See application file for complete search history.

(56) References Cited

U.S. PATENT DOCUMENTS

| | | | |
|---|---|---|---|
| 3,677,535 A * | 7/1972 | Beck ........................ | F16F 1/40 267/294 |
| 3,682,466 A | 8/1972 | Huchette et al. | |
| 4,135,283 A * | 1/1979 | Kohlhage ............... | F16F 1/324 148/580 |
| 10,677,311 B2 * | 6/2020 | Yue ........................ | F16F 15/08 |
| 2004/0113338 A1 * | 6/2004 | Wietharn ................ | F16F 1/403 267/141.1 |
| 2007/0145654 A1 | 6/2007 | Wietharn | |
| 2014/0064944 A1 * | 3/2014 | Li .......................... | F16F 1/324 415/182.1 |

FOREIGN PATENT DOCUMENTS

| | | | | |
|---|---|---|---|---|
| CN | 110159683 A | * | 8/2019 | |
| DE | 718344 C | * | 3/1942 | ............ B60G 11/40 |
| DE | 3309002 A1 | * | 9/1983 | ............ B60G 5/053 |
| DE | 19608860 A1 | * | 9/1997 | ................ F16F 1/40 |
| DE | 102017105905 A1 | * | 9/2017 | ............. F16F 1/324 |
| EP | 1002674 A2 | | 5/2000 | |
| FR | 1222212 A | * | 6/1960 | .......... F16D 13/583 |
| FR | 2142158 A5 | | 1/1973 | |
| GB | 1000168 A | * | 8/1965 | ............. F16F 1/324 |
| GB | 1402144 A | | 8/1975 | |
| GB | 2011017 A | * | 7/1979 | ............. F16F 1/324 |
| GB | 2117085 A | * | 10/1983 | ............. B60G 5/053 |
| JP | 01164828 A | * | 6/1989 | ............. B21D 28/22 |
| WO | WO-9401695 A1 | * | 1/1994 | ............. F16F 1/403 |
| WO | WO-03041975 A1 | * | 5/2003 | ............... B60G 5/02 |
| WO | 2004109147 A1 | | 12/2004 | |
| WO | WO-2007004949 A1 | * | 1/2007 | ............. B60G 5/053 |
| WO | WO-2018127420 A1 | * | 7/2018 | ......... F01N 13/1855 |
| WO | WO-2019170844 A1 | * | 9/2019 | ................ F16F 1/40 |

* cited by examiner

SPRING ASSEMBLY FOR A VEHICLE BOGIE SUSPENSION ARRANGEMENT

CROSS REFERENCE TO RELATED APPLICATIONS

This application is a 35 U.S.C. § 371 national stage application of PCT International Application No. PCT/EP2019/055806 filed on Mar. 8, 2019, which in turns claims foreign priority to Indian Patent Application No. 201841008605, filed on Mar. 8, 2018, the disclosures and content of which are incorporated by reference herein in their entirety.

TECHNICAL FIELD

The invention relates to a spring assembly for a vehicle bogie suspension arrangement. Moreover, the present invention relates to a bogie suspension arrangement for a vehicle as well as to a vehicle. Further, the present invention relates to a method for manufacturing a spring assembly for a vehicle.

The invention can be applied in heavy-duty vehicles, such as trucks, buses and construction equipment. Although the invention will be described with respect to a truck, the invention is not restricted to this particular vehicle, but may also be used in other vehicles such as a bus or a working machine.

BACKGROUND

A spring assembly may be used in various positions in a vehicle. For instance, a spring assembly may be used in a vehicle bogie suspension arrangement of a heavy-duty vehicle, such as a truck.

One type of a spring assembly is a so called rubber tower, which may also be referred to as a rubber spring or a rubber bolster. Such a rubber tower may comprise a set of flat metal plates, arranged parallel to each other, which are moulded into a rubber body.

However, a spring assembly such as the one exemplified above may not provide sufficient stiffness in at least one of a lateral or vertical direction when the spring assembly is used in a vehicle.

As such, it would be desirable to improve the spring assembly that can be used for a vehicle bogie suspension arrangement.

SUMMARY

An object of the invention is to provide a spring assembly for a vehicle bogie suspension arrangement which spring assembly provides an appropriate stiffness in at least one of a lateral and vertical direction during use.

The object is achieved by a spring assembly according to claim 1.

As such, the present invention relates to a spring assembly for a vehicle bogie suspension arrangement. The spring assembly comprises a set of washers moulded into an elastomer body. The spring assembly has an axial extension in an axial direction and the washers are arranged relative to each other in the axial direction.

According to the present invention, at least one, preferably a plurality, of the washers is a spring washer comprising a spring washer body and at least two spring tongues. Each spring tongue has a spring base connected to the spring washer body and a spring tip distal to the spring base. At least a portion of the spring tongue is located at a non-zero distance from the spring base in the axial direction.

The above-mentioned at least two spring tongues which are moulded-in to the elastomer body will provide a springing characteristic to the spring assembly. For instance, the at least two spring tongues may provide a springing characteristic in a lateral direction of the vehicle when the spring assembly is mounted in a vehicle. This is since the at least two spring tongues are moulded into the elastomer body such that when a portion of the elastomer body is subjected to a lateral displacement, such a displacement will be transferred to the at least two spring tongues. Since at least a portion of each spring tongue is located at a non-zero distance from the spring base in the axial direction, such a displacement will result in a lateral spring force from the spring tongues which consequently will result in an additional lateral stiffness of the spring assembly.

As used herein, the term "spring tongue" is intended to encompass a cantilever member one end of which—namely the spring base—is anchored to the spring washer body and the other end of which—namely the spring tip—is not anchored to the washer body.

By way of example, the vertical stiffness of the spring washer is a function of the ratio between the non-zero distance and the thickness of the spring washer, i.e. $\Delta/t$ wherein $\Delta$ indicates the non-zero distance and t indicates the thickness. By varying the non-zero distance and for instance keeping the thickness constant, the spring force characteristics can be adjusted over a wide range. Purely by way of example, the non-zero distance may be at least 2% of the diameter of the spring washer. As a non-limiting example, the non-zero distance may be within the range of 2-20% of the diameter of the spring washer. If the spring washer does not have a circular shape, the diameter of the spring washer is defined as the diameter of a smallest circle that can circumscribe the perimeter of the spring washer.

Optionally, the spring tip of the spring tongue is located at a non-zero distance from the spring base in the axial direction. Arranging the spring tip at a non-zero distance from the spring base will result in appropriate possibilities to obtain requisite stiffness characteristics in at least one of the lateral and vertical directions.

Optionally, a tip portion extends from the spring tip towards the spring base. The spring tongue has a spring tongue length, along the spring tongue from the spring tip to the spring base, and the tip portion having a tip portion length. The tip portion length is at least 5% of the spring tongue length, the tip portion extending substantially perpendicularly to the axial direction. Such a configuration of the spring tongue will increase the possibilities for the elastomer to adhere to the spring tongue which in turn will increase the possibilities to obtain requisite stiffness characteristics.

Optionally, the spring washer comprises an outer circumference extending around a central axis. Each one of the spring tongues of the spring washer extends in a direction from the circumference towards the central axis. Such a configuration implies a possibility to obtain a compact spring assembly.

Optionally, the spring washer comprises at least four, preferably at least six, spring tongues. The above implementation of the spring washer implies that appropriate stiffness characteristics may be obtained in several horizontal directions when the spring washer is mounted in a vehicle.

Optionally, a plurality of the washers is a spring washer such that the spring assembly comprises a first spring washer and a second spring washer. The first and second spring washers are oriented relative to each other such that the non-zero distances, as seen from said spring base to said portion of said spring tongue in said axial direction, for spring tongues of the first and second washers extend in opposite directions. Such a configuration implies that appropriate stiffness characteristics may be obtained at a relatively short axial distance.

Optionally, the elastomer body is a rubber body. A rubber body is a preferred implementation of the elastomer body since a rubber body generally may provide appropriate stiffness characteristics. Moreover, the use of a rubber body implies an appropriate adherence between the rubber body and the washers, such as the at least one spring washer.

Optionally, the spring washer is made of metal, preferably steel. A metal spring washer implies appropriate springing characteristics.

Optionally, the spring assembly further comprises a first and a second interface plate located on opposite sides of the elastomer body in the axial direction. The spring assembly further comprises a tensioning arrangement at least partially extending through the elastomer body and connecting the interface plates. By virtue of the above members, it is possible to pretension to the spring assembly prior to use.

Optionally, the tensioning arrangement comprises a bolt and a nut, preferably a bolt having a bolt portion with a conical envelope surface, adapted to abut the first interface plate, and a nut having a nut portion with a conical envelope surface, adapted to abut the second interface plate.

A second aspect of the present invention relates to a bogie suspension arrangement for a vehicle, preferably a rear bogie suspension arrangement for a vehicle. The bogie suspension arrangement comprises a spring assembly according to the first aspect of the present invention.

A third aspect of the present invention relates to a vehicle, preferably a heavy-duty vehicle, such as a truck, comprising a spring assembly according to the first aspect of the present invention and/or a bogie suspension arrangement according to the second aspect of the present invention.

A fourth aspect of the present invention relates to a method for manufacturing a spring assembly for a vehicle. The method comprises:
  arranging a plurality of washers in a mould such that the washers are arranged relative to each other in an axial direction, at least one, preferably a plurality, of the washers being a spring washer comprising a spring washer body and at least two spring tongues, each spring tongue having a spring base connected to the spring washer body and a spring tip distal to the spring base, at least a portion of the spring tongue being located at a non-zero distance from the spring base in the axial direction,
  introducing liquid elastomer into the mould.

Optionally, a plurality of the washers is a spring washer and wherein the step of arranging the plurality of washers in the mould comprises attaching at least two spring washers to each other, preferably by attaching together the spring washer bodies of the at least two spring washers, before the liquid elastomer is introduced into the mould.

Optionally, the method comprises arranging at least a first and a second washer relative to each other such that the non-zero distances, as seen from said spring base to said portion of said spring tongue in said axial direction, for spring tongues of the first and second washers extend in opposite directions, before the liquid elastomer is introduced into the mould.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE
EMBODIMENTS OF THE INVENTION

The invention will be described below for a vehicle in the form of a truck 10 such as the truck illustrated in FIG. 1. The truck 10 should be seen as an example of a vehicle which could comprise a spring assembly and/or a bogie suspension according to the present invention.

However, the present invention may be implemented in a plurality of different types of vehicles. Purely by way of example, the present invention could be implemented in a truck, a tractor, a car, a bus, a work machine such as a wheel loader or an articulated hauler, or any other type of construction equipment.

Figure 1:
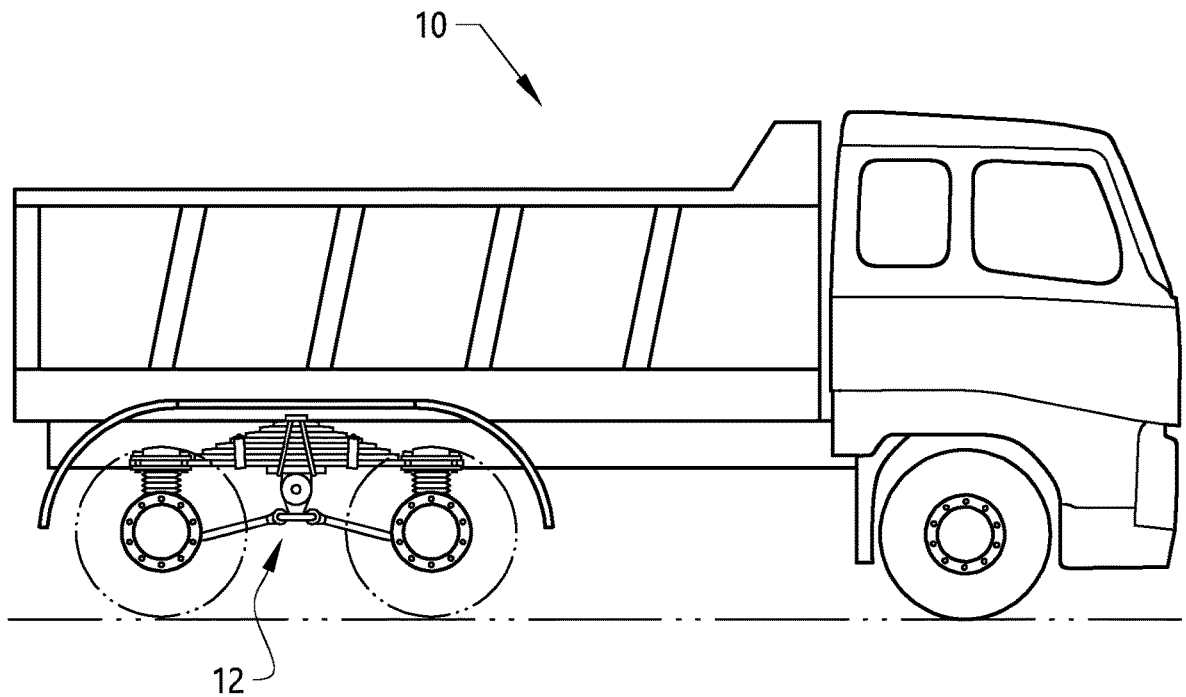
FIG. 1 is a schematic view of a vehicle.
Figure 2:
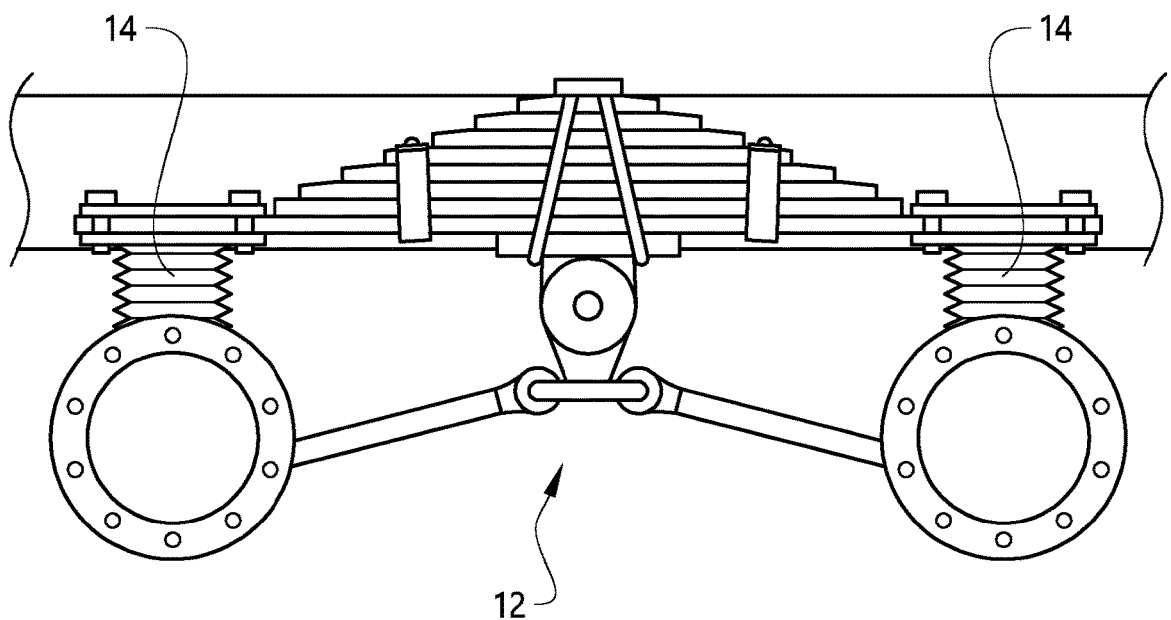
FIG. 2 is a schematic view of a bogie suspension arrangement.

The FIG. 1 vehicle 10 comprises a bogie suspension arrangement 12 as illustrated in FIG. 2. As may be gleaned from FIG. 2, the bogie suspension arrangement 12 comprises two spring assemblies 14.

Figure 3:
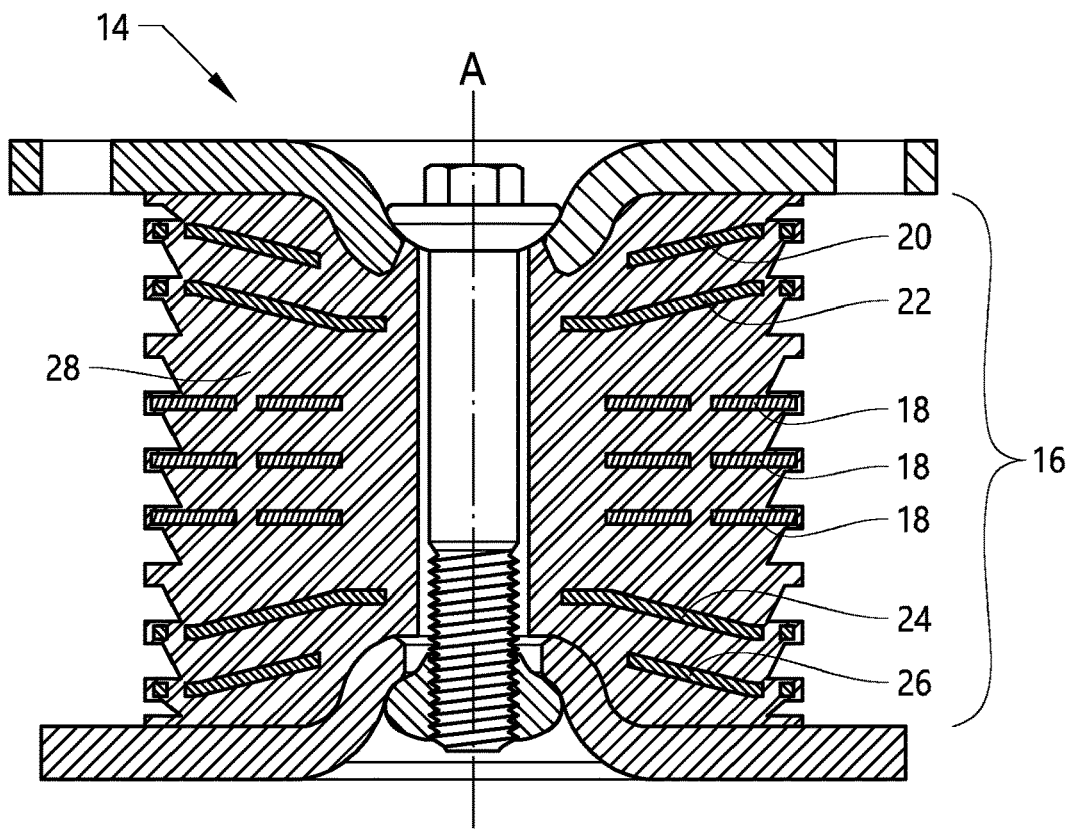
FIG. 3 is a cross-sectional view of an embodiment of a spring assembly.

FIG. 3 is a cross-sectional view of an embodiment of a spring assembly 14 for a vehicle bogie suspension arrangement 12. The spring assembly 14 comprises a set 16 of washers 18, 20, 22, 24, 26 moulded into an elastomer body 28. The spring assembly 14 has an axial extension in an axial direction A and the washers 18, 20, 22, 24, 26 are arranged relative to each other in the axial direction A. In the embodiment illustrated in FIG. 3, the washers are aligned in the axial direction A and spaced from each other in the axial direction A.

As used herein, the term "elastomer body" relates to a body of a polymer that can be stretched upon the application of a load and which is adapted to assume its original shape when unloaded. Purely by way of example, the "elastomer body" may comprise or even constitute a rubber body. Here, the term "rubber" encompasses natural rubber as well as synthetic rubber.

According to the present invention, at least one, preferably a plurality, of the washers is a spring washer. The embodiment illustrated in FIG. 3 comprises four spring washers 20, 22, 24 and 26.

Purely by way of example, a spring washer 20, 22, 24, 26 may be made out of made of metal, preferably steel.

Figure 4:
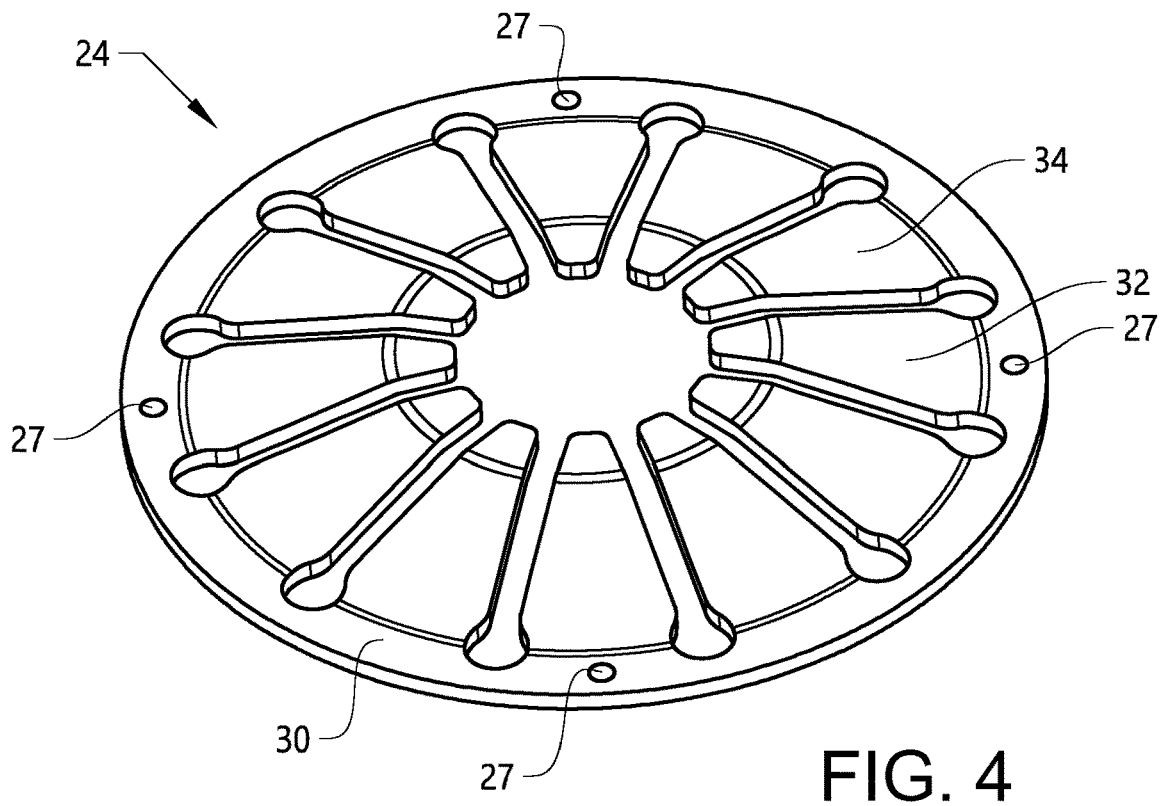
FIG. 4 is a perspective view of a spring washer.

FIG. 4 illustrates a perspective view of one of the spring washers 24 from the FIG. 3 embodiment. As indicated in FIG. 4, the spring washer 24 comprises a spring washer body 30 and at least two spring tongues 32, 34. In fact, the FIG. 4 implementation of the spring washer 24 comprises twelve spring tongues.

Moreover, the FIG. 4 spring washer 24 comprises a plurality of alignment openings 27. The purpose of the alignment openings 27 is to keep spring washers aligned when manufacturing the spring assembly 14. This possibility is discussed further hereinbelow with reference to FIG. 9.

Figure 5A:
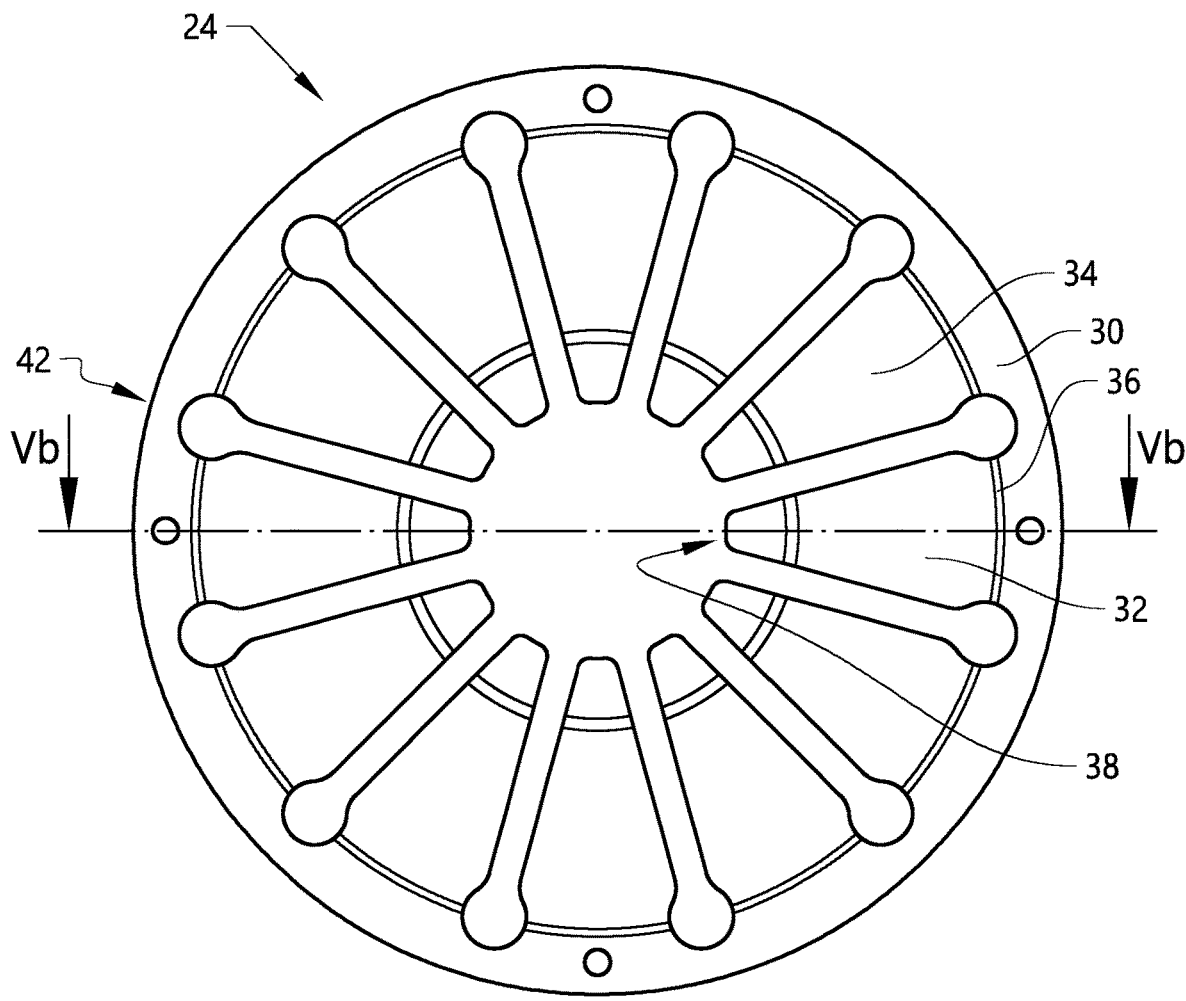
FIGS. 5a and 5b is a top view and cross-sectional view, respectively, of the FIG. 4 spring washer.
Figure 5B:
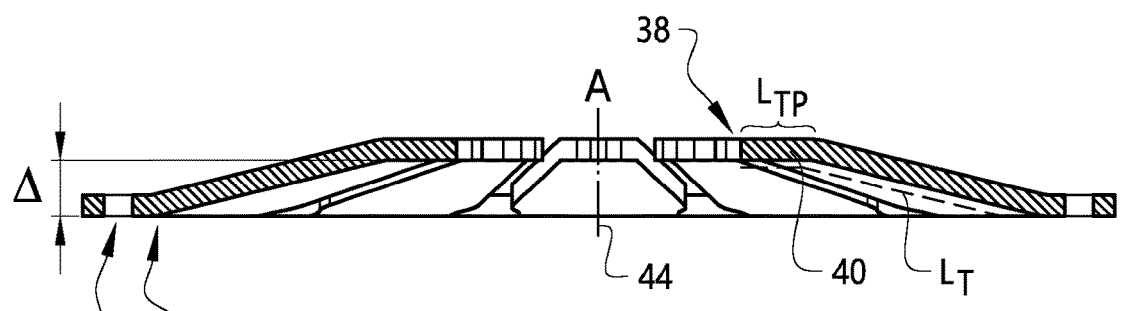

FIGS. 5a and 5b illustrate the first and second spring tongues 32, 34 in the FIG. 4 implementation of the spring washer 24. Features of each spring tongue 32, 34 will be described hereinbelow with reference to the first spring tongue 32. However, it should be emphasized that the below description is equally applicable to each one of the other spring tongues of a spring washer 24.

As such, with reference to the first spring tongue 32, each spring tongue has a spring base 36 connected to the spring washer body 30 and a spring tip 38 distal to the spring base 36. At least a portion of the spring tongue 32 is located at a non-zero distance A from the spring base 36 in the axial direction A. Further, as indicated in FIG. 5b, the non-zero distance A may be determined by selecting one side of the spring washer 24, as seen in the axial direction A, and measuring the distance from the spring base 36 to the portion of the spring tongue. In the FIG. 5b example, the bottom side of the spring washer 24 has been selected when determining the non-zero distance A but it is of course also possible to use the upper side of the spring washer 24 instead.

In the implementation of the first spring tongue 32 illustrated in FIGS. 5a and 5b, the spring tip 38 of the spring tongue 32 is located at the non-zero distance A from the spring base 36 in the axial direction.

Further, in the implementation of the first spring tongue 32 illustrated in FIGS. 5a and 5b, a tip portion 40 extends from the spring tip 38 towards the spring base 36. The spring tongue 32 has a spring tongue length $L_T$, along the spring tongue 32 from the spring tip 38 to the spring base 36, and the tip portion has a tip portion length $L_{TP}$. The tip portion length $L_{TP}$ is at least 5% of the spring tongue length $L_T$ and the tip portion 40 extends substantially perpendicularly to the axial direction A. In the implementation of the first spring tongue 32 illustrated in FIGS. 5a and 5b, the tip portion length $L_{TP}$ is approximately 25% of the spring tongue length $L_T$.

Moreover, again with reference to the implementation illustrated in FIGS. 5a and 5b, the spring washer 24 may comprise an outer circumference 42 extending around a central axis 44. Each one of the spring tongues 32, 34 of the spring washer 22 extends in a direction from the circumference 42 towards the central axis 44. As such, in the implementation of the spring washer 24 illustrated in FIGS. 5a and 5b, the spring washer body 30 is located radially outside the spring tongues 32, 34 such that a radial outer portion of the spring washer body 30 defines the outer circumference 42 of the spring washer 24. However, it is also envisaged that embodiments of the spring washer 42 may comprise a spring washer body (not shown) located radially inwards of the spring tongues 32, 34. Purely by way of example, in such an implementation, the spring tongues may extend radially outwards from spring washer body.

Furthermore, although the spring washers 24 are illustrated as being substantially circular in the figures, it is also envisaged that implementations of the spring washer may have outer shapes, such as oval or rectangular shapes (not shown).

Purely by way of example, the spring washer 24 may comprise at least four, preferably at least six, spring tongues. The implementation illustrated in FIGS. 5a and 5b comprises twelve spring tongues.

A spring assembly 14 may comprise a plurality of spring washers. In the embodiment illustrated in FIG. 3, the spring assembly 14 comprises a set of flat washers 18 and a set of spring washers 20, 22, 24, 26. It is also conceivable that embodiments of the spring assembly 14 may comprise further elements (not shown) moulded into the elastomer body.

Figure 6:
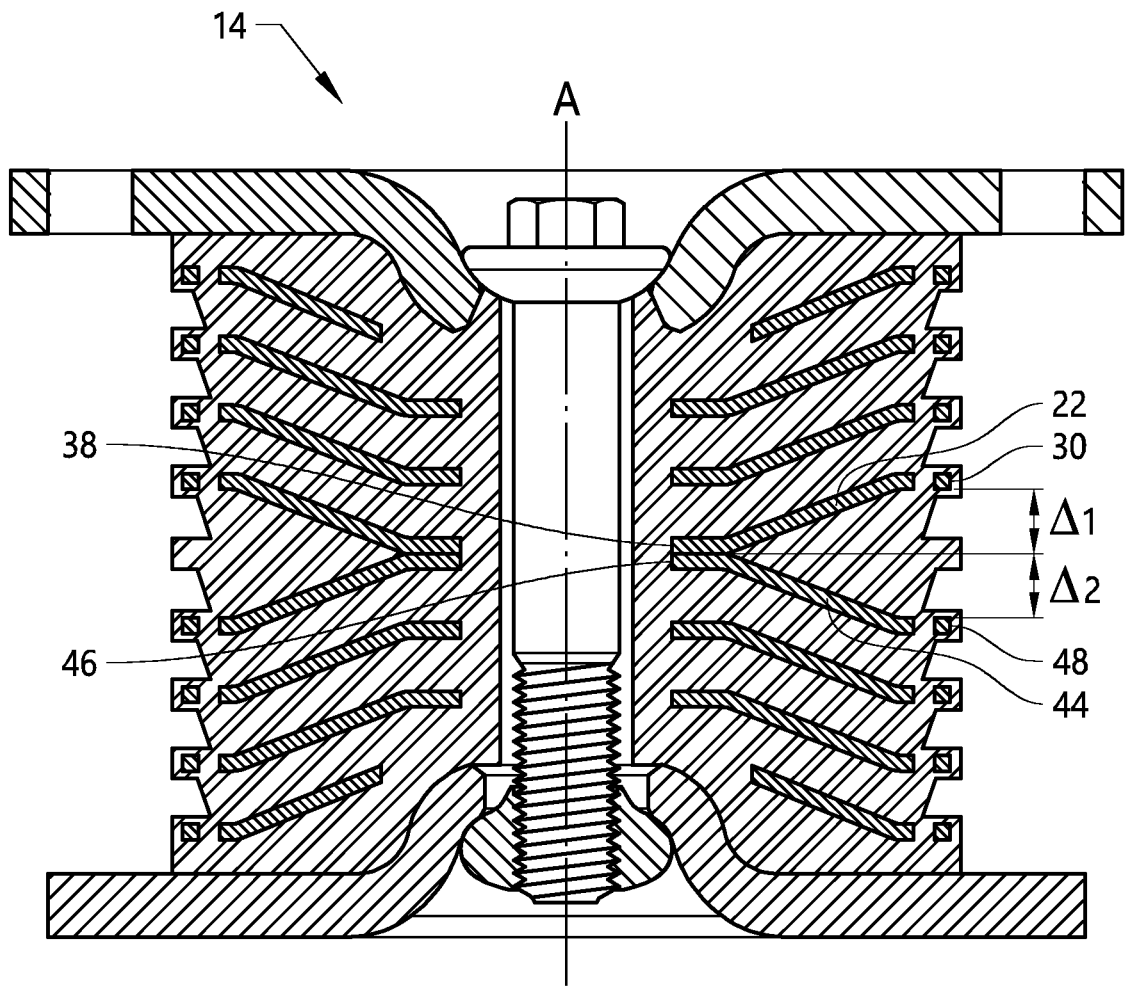
FIG. 6 is a cross-sectional view of another embodiment of a spring assembly.

FIG. 6 illustrates another embodiment of the spring assembly 14 wherein a plurality of the washers is a spring washer such that the spring assembly comprises a first spring washer 22 and a second spring washer 44. The first and second spring washers 22, 44 are oriented relative to each other such that the non-zero distances $\Delta_1$, $\Delta_2$, as seen from the spring base 36 to the portion of the spring tongue 32 in the axial direction A, for spring tongues of the first and second spring washers 22, 44 extend in opposite directions, as seen in the axial direction A. In the FIG. 6 embodiment, the first and second spring washers 22, 44 are oriented such that the spring tip 38 of the first spring washer 22 and the spring tip 46 of the second spring washer 44 are closer to each other, as seen in the axial direction A, than the spring washer bodies 30, 48 of the first and second spring washers 22, 44.

However, it is also possible to orient first and second spring washers 22, 44 such that the spring tip 38 of the first spring washer 22 and the spring tip 46 of the second spring washer 44 are further away from each other, as seen in the axial direction A, than the spring washer bodies 30, 48 of the first and second spring washers 22, 44. Such an embodiment is illustrated in FIG. 7.

Figure 7:
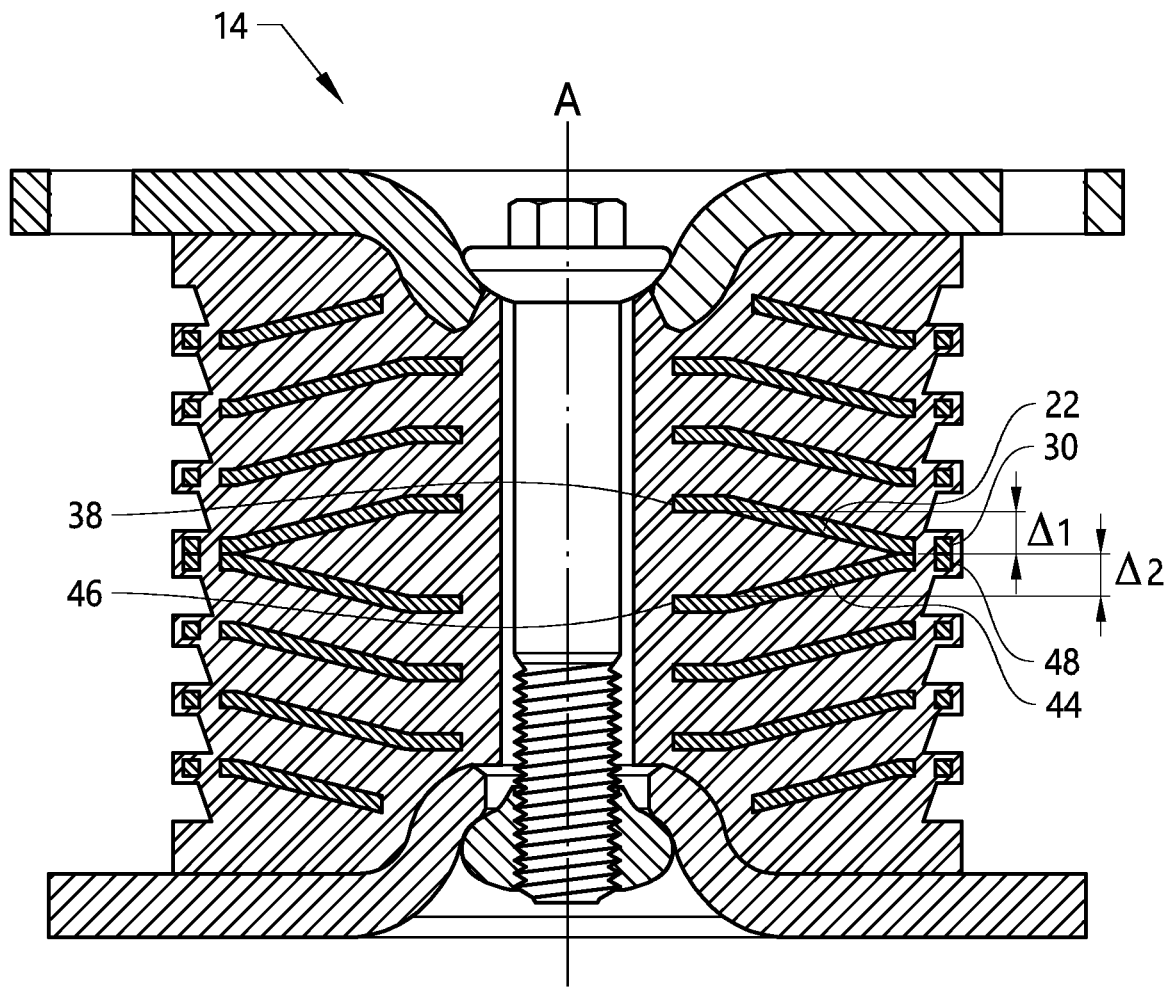
FIG. 7 is a cross-sectional view of a further embodiment of a spring assembly.
Figure 8:
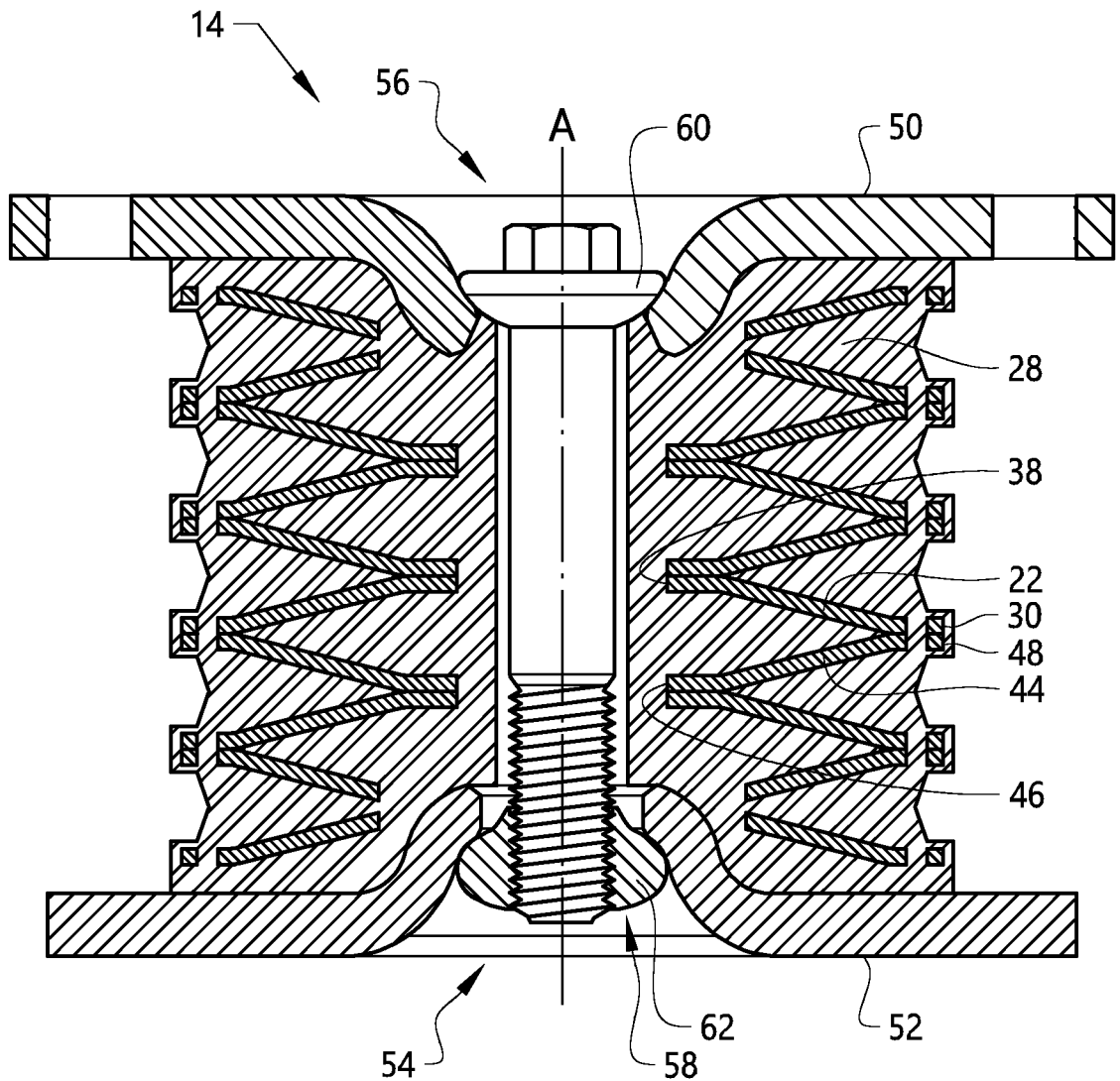
FIG. 8 is a cross-sectional view of yet another embodiment of a spring assembly.

It is further envisaged that embodiments of the spring assembly may comprise combinations of the FIG. 6 and FIG. 7 embodiments; an example of such a combination is presented in FIG. 8.

Irrespective of the number and orientation of spring washers, the spring assembly 14 may preferably further comprise a first 50 and a second 52 interface plate located on opposite sides of the elastomer body 28 in the axial direction A. The spring assembly further comprises a tensioning arrangement 54 at least partially extending through the elastomer body 28 and connecting the interface plates 50, 52.

Purely by way of example, and as indicated in FIG. 8, the tensioning arrangement 54 may comprise a bolt 56 and a nut 58. For instance, and as indicated in FIG. 8, the bolt 56 may have a bolt portion 60 with a conical envelope surface, adapted to abut the first interface plate 50, and a nut 58 having a nut portion 62 with a conical envelope surface, adapted to abut the second interface plate 52.

Figure 9:
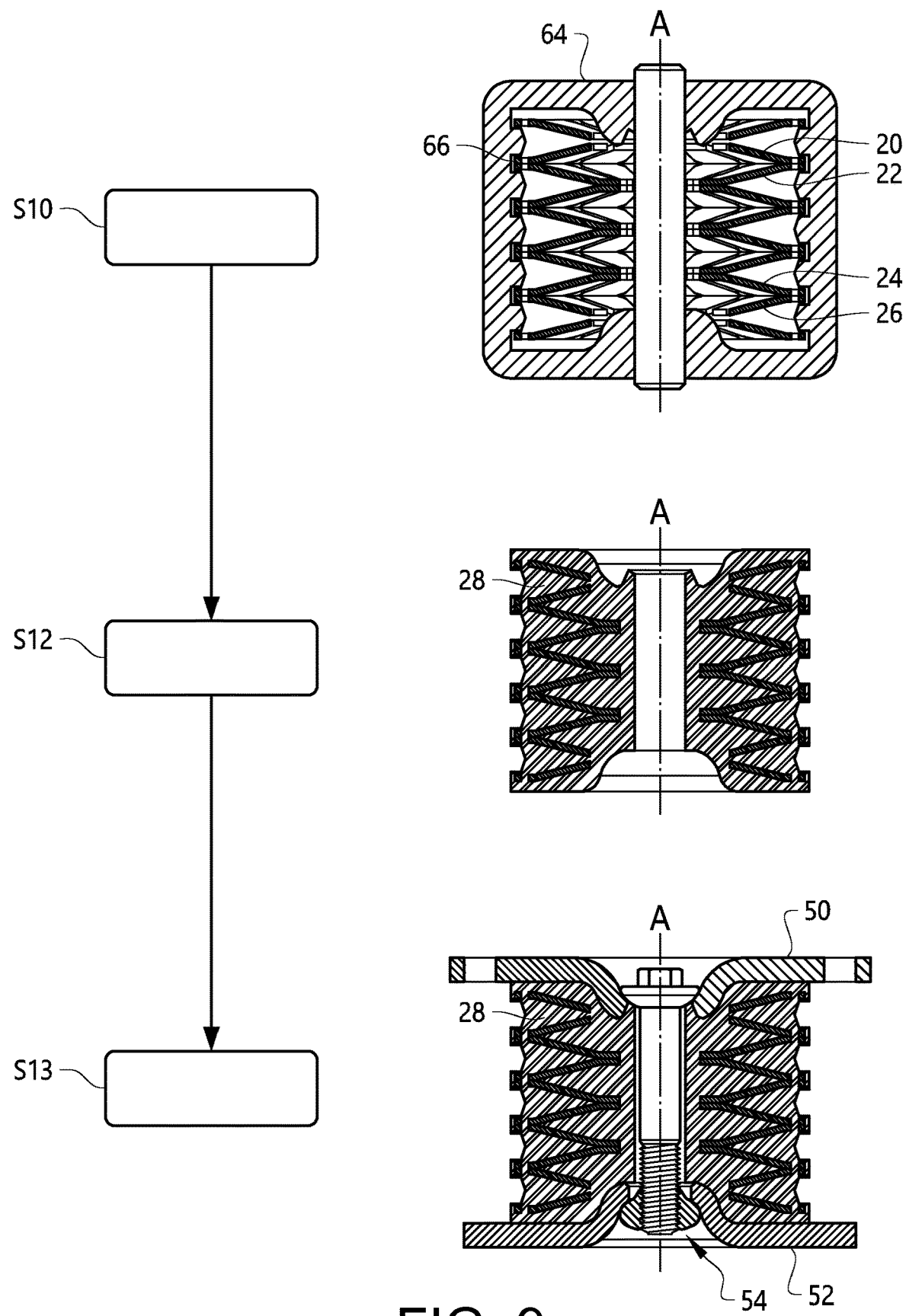
FIG. 9 is a flow chart illustrating an embodiment of a method for manufacturing a spring assembly.

FIG. 9 illustrates an embodiment of a method for manufacturing a spring assembly for a vehicle. The method comprises:

S10 arranging a plurality of washers 20, 22, 24, 26 in a mould 64 such that the washers 20, 22, 24, 26 are arranged relative to each other in an axial direction A, at least one, preferably a plurality, of the washers 20, 22, 24, 26 being a spring washer comprising a spring washer body and at least two spring tongues, each spring tongue having a spring base connected to the spring washer body and a spring tip distal to the spring base, at least a portion of the spring tongue being located at a non-zero distance from the spring base in the axial direction, and S12 introducing liquid elastomer 28 into the mould 64.

Purely by way of example, and as exemplified in FIG. 9, a plurality of the washers may be a spring washer 20, 22, 24, 26 and the step S10 of arranging the plurality of washers in the mould comprises attaching at least two spring washers 20, 22 to each other, preferably by attaching together the spring washer bodies of the at least two spring washers, before the liquid elastomer 28 is introduced into the mould 64.

As a non-limiting example, the above alignment may be achieved using the alignment openings 27 that have been discussed above with reference to FIG. 4. As such, when spring washers are placed relative to each other in the axial direction A, adjacent spring washers may be attached to each other by introducing attachment means 66 into the alignment openings.

Purely by way of example, the attachment means 66 may comprise pins and/or rivets extending through the alignment openings 27 of the spring washers 20, 22. Instead of, or in addition to the above examples, adjacent spring washers may be attached to each other using other attachment means such as weld joints or glue joints.

Further, as illustrated in FIG. 9, embodiments of the method may comprise arranging at least a first 20 and a second 22 washer relative to each other such that the non-zero distances, as seen from the spring base 36 to the portion of the spring tongue 32 in the axial direction A, for spring tongues of the first and second washers extend in opposite directions, before the liquid elastomer 28 is introduced into the mould 64.

Moreover, FIG. 9 illustrates a further step of an embodiment of a method for manufacturing a spring assembly for a vehicle. The further step comprises:

S13 arranging a first 50 and a second 52 interface plate on opposite sides of the elastomer body 28 in the axial direction A and tensioning the elastomer body using a tensioning arrangement 54 at least partially extending through the elastomer body 28 and connecting the interface plates 50, 52.

It is to be understood that the present invention is not limited to the embodiments described above and illustrated in the drawings; rather, the skilled person will recognize that many changes and modifications may be made within the scope of the appended claims.

The invention claimed is:

1. A spring assembly for a vehicle bogie suspension arrangement, said spring assembly comprising a set of washers moulded into an elastomer body, said spring assembly having an axial extension in an axial direction and said washers being arranged relative to each other in said axial direction, wherein at least one of said washers is a spring washer comprising a spring washer body and at least two spring tongues, each spring tongue having a spring base connected to said spring washer body and a spring tip distal to said spring base, at least a portion of said spring tongue being located at a non-zero distance from said spring base in said axial direction.

2. The spring assembly according to claim 1, wherein said spring tip of said spring tongue is located at a non-zero distance from said spring base in said axial direction.

3. The spring assembly according to claim 1, wherein a tip portion extends from said spring tip towards said spring base, said spring tongue having a spring tongue length ($L_T$), along said spring tongue from said spring tip to said spring base, and said tip portion having a tip portion length ($L_{TP}$), said tip portion length ($L_{TP}$) being at least 5% of said spring tongue length ($L_T$), said tip portion extending substantially perpendicularly to said axial direction.

4. The spring assembly according to claim 1, wherein said spring washer comprises an outer circumference extending around a central axis, each one of said spring tongues of said spring washer extending in a direction from said circumference towards said central axis.

5. The spring assembly according to claim 1, wherein said spring washer comprises at least four spring tongues.

6. The spring assembly according to claim 1, wherein a plurality of said washers is a spring washer such that said spring assembly comprises a first spring washer and a second spring washer, said first and second spring washers being oriented relative to each other such that said non-zero distance, as seen from said spring base to said portion of said spring tongue in said axial direction, for spring tongues of said first and second washers extend in opposite directions.

7. The spring assembly according to claim 1, wherein said elastomer body is a rubber body.

8. The spring assembly according to claim 1, wherein said spring washer is made of metal.

9. The spring assembly according to claim 1, further comprising a first and a second interface plate located on opposite sides of said elastomer body in said axial direction, said spring assembly further comprising a tensioning arrangement at least partially extending through said elastomer body and connecting said interface plates.

10. The spring assembly according to claim 9, wherein said tensioning arrangement comprises a bolt and a nut adapted to abut said first interface plate, and a nut having a nut portion with a conical envelope surface, adapted to abut said second interface plate.

11. A bogie suspension arrangement for a vehicle said bogie suspension arrangement comprising a spring assembly according to claim 1.

12. A vehicle comprising a spring assembly according to claim 1.

13. The spring assembly according to claim 1, wherein the at least two spring tongues provide a springing characteristic in a lateral direction of the vehicle when the spring assembly is mounted in a vehicle.

14. A method for manufacturing a spring assembly for a vehicle, said method comprising:

arranging a plurality of washers in a mould such that said washers are arranged relative to each other in an axial direction, at least one of said washers being a spring washer comprising a spring washer body and at least two spring tongues, each spring tongue having a spring base connected to said spring washer body and a spring tip distal to said spring base, at least a portion of said spring tongue being located at a non-zero distance from said spring base in said axial direction, and introducing liquid elastomer into said mould.

15. The method according to claim 14, wherein a plurality of said washers is a spring washer and wherein said step of arranging said plurality of washers in said mould comprises attaching at least two spring washers to each other before the liquid elastomer is introduced into said mould.

16. The method according to claim 15, wherein said method comprises arranging at least a first and a second washer relative to each other such that said non-zero distances, as seen from said spring base to said portion of said spring tongue in said axial direction, for spring tongues of said first and second washers extend in opposite directions, before the liquid elastomer is introduced into said mould.

\* \* \* \* \*